United States Patent Office 3,051,259
Patented Aug. 28, 1962

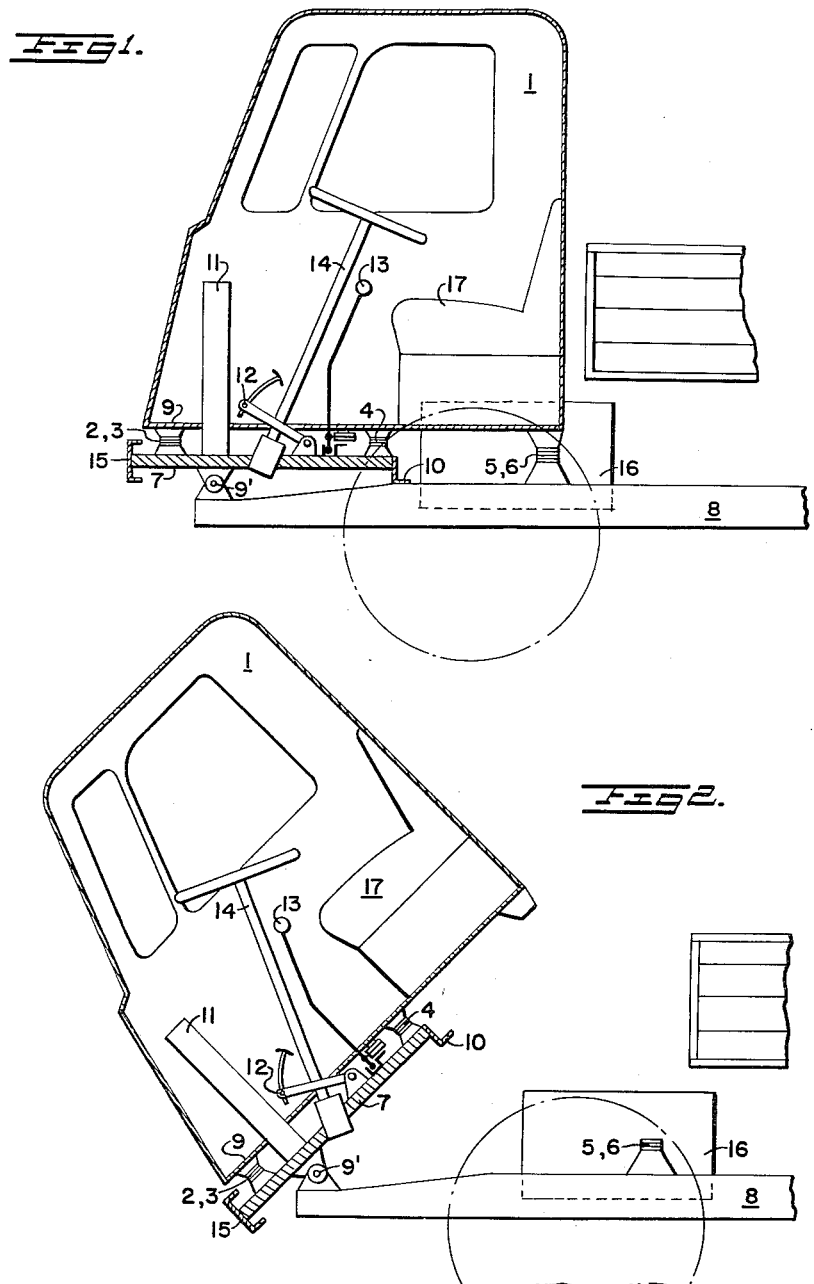

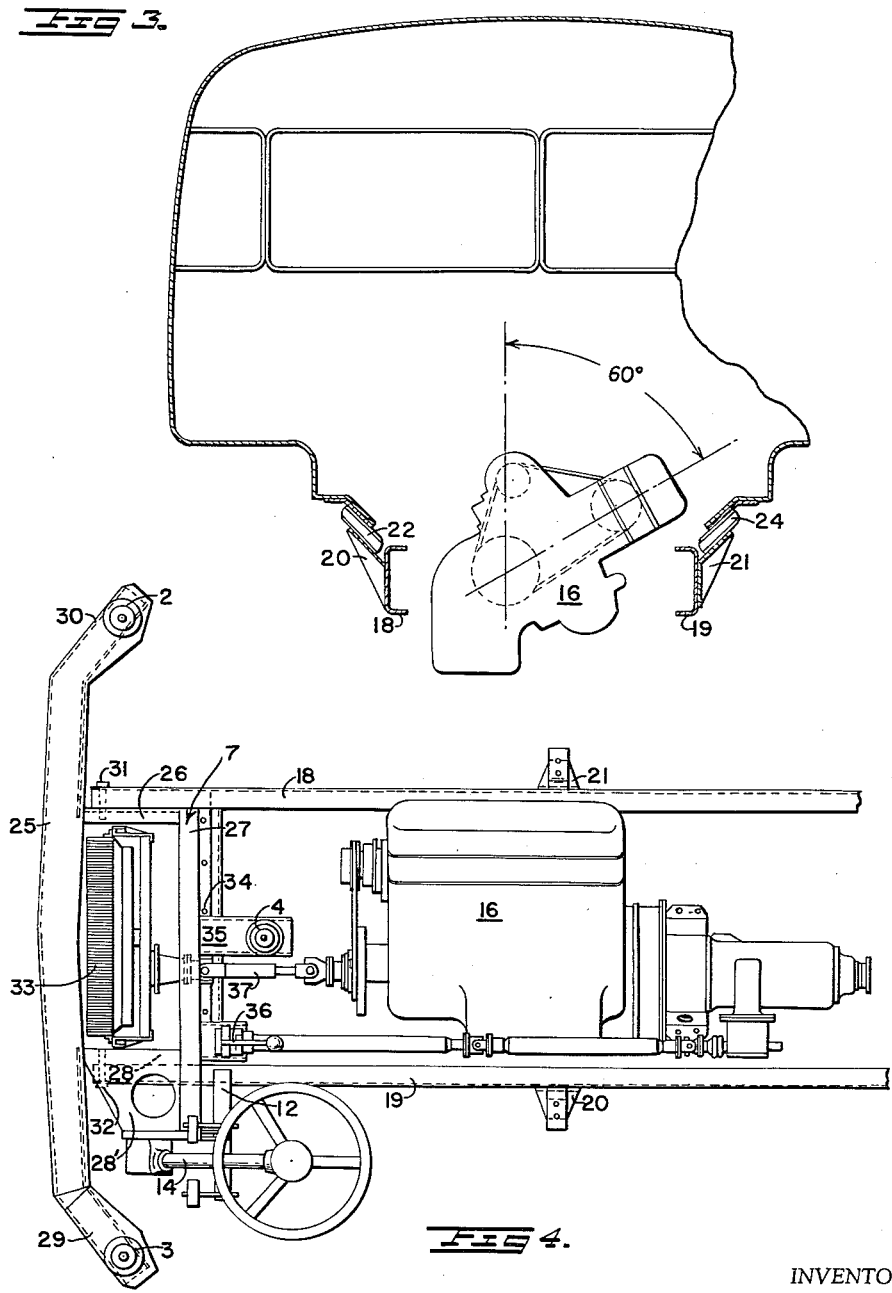

3,051,259
MOTOR VEHICLE CONSTRUCTION
Otto Lorenz, Fellbach, near Stuttgart, Germany, assignor to Daimler-Benz Aktiengesellschaft, Stuttgart-Unterturkheim, Germany
Filed Feb. 6, 1959, Ser. No. 791,641
Claims priority, application Germany Feb. 11, 1958
10 Claims. (Cl. 180—89)

The present invention relates to a motor vehicle construction, and more particularly to a truck-type motor vehicle the driver cab of which is preferably constructed as a pullman-type driver house or cab.

The driver cab constructions of the prior art usually include retracted drive units or aggregates and distinguish themselves by a relatively good visibility of the road. However, the engine which is arranged on the inside of the known prior art driver cab constructions, and more particularly between the driver seat and the seat of the companion driver, operates in a relatively annoying and disturbing manner because of its noises and also reduces thereby the available space by reason of its own spatial requirements. The accommodation of a continuous seat bench for several persons is not possible with such prior art arrangements of the drive aggregates or units. Furthermore this arrangement of the prior art causes a considerable generation of heat within the driver housing which becomes unpleasantly noticable particularly on hot days.

The present invention is concerned with the task of eliminating the aforementioned disadvantages and to create a driver compartment or driver cab in which the passenger space may be utilized fully especially for the accommodation therein of persons.

These advantages are achieved in accordance with the present invention by supporting the engine below the seat bench with the longitudinal axis thereof disposed in the driving direction of the vehicle and inclined by approximately 60° with respect to the vertical about the crankshaft thereof and by arranging the driver cab so as to be tiltable forwardly whereby the engine is rendered free or exposed.

According to a preferred embodiment in accordance with the present invention, the floor of the driver cab is rigidly connected in the forward region thereof with an auxiliary frame extending below the driver cab floor and tiltably secured at the main vehicle frame by the interposition of elastic bearing members and is mounted in the rear region thereof on the main vehicle frame or vehicle superstructure also by the interposition of elastic bearing members so as to be readily detachable and liftable therefrom.

The auxiliary frame elastically connected with the floor of the driver cab and constructed as a tiltable auxiliary frame is connected at the forward end of the vehicle main frame by means of two rotatable or pivotal bearing means with the vehicle main frame and is threadably secured at the rear end thereof in a rigid manner with the frame however in such a manner as to be readily detachable therefrom.

The entire driver cab is supported in accordance with the present invention preferably over five elastic bearing members, preferably rubber bearings with respect to the undercarriage or sub-frame of the vehicle. Three of these elastic bearings thereby connect rigidly the driver cab with the tiltable auxiliary frame. Two of these elastic bearing members are arranged on the cross bearer member of the driver cab disposed at the front end thereof and a further elastic bearing member in the vertical central longitudinal plane, preferably within the region of the rigid but detachable connection of the tiltable auxiliary frame with the vehicle main frame or superstructure. The two remaining elastic bearing members are arranged as readily detachable and direct abutments between the driver cab and the vehicle frame or superstructure.

The tiltable auxiliary frame itself consists essentially of channel irons or sections which are interconnected so as to form an essentially rectangular frame. The front channel iron of the tiltable auxiliary frame which extends transversely to the driving direction of the vehicle as cross bearer member for the driver cab projects beyond the vehicle frame on both sides thereof and may be used directly as a bumper or as a bumper support member.

According to another feature in accordance with the present invention, the tiltable auxiliary frame may serve as immediate support for the steering gear, the foot pedal mechanism, the cooler or radiator, and the shifting lever of the vehicle and may thereby effectively cancel or eliminate for these parts the spring support thereof which would normally be caused by the elastic support of the driver cab.

According to one embodiment in accordance with the present invention, the cooler or radiator is disposed behind the cross bearer member of the auxiliary tiltable frame supporting the driver cab and the foot pedal mechanism, the shifting lever and steering column are arranged therebehind in the driving direction of the vehicle.

For purposes of damping the tilting movement of the driver cab and for halting the same in a predetermined position, separate special means such as, for example, shock absorbers are provided which are pivotally connected, on the one hand, on the tiltable auxiliary frame or on the driver cab and, on the other, on the vehicle sub-frame and which damp the tilting movement as well as retain the driver cab in the tilted position thereof.

According to a preferred embodiment in accordance with the present invention, the auxiliary tiltable frame constructed as a rectangular auxiliary frame is disposed with the relatively longer frame members extending transversely to the driving direction between the longitudinal bearer members of the main frame and is pivotally connected at the relatively shorter frame members near the forward end of the longitudinal main frame bearer members. The forward transversely extending bearer member of the rectangular axiliary frame is of relatively stronger, more sturdy channel construction as compared to the remaining parts thereof and extends beyond both sides of the main frame and is angularly bent backwardly in the vehicle longitudinal direction in the region of the ends thereof. The angularly bent ends each carry an elastic support for the driver cab. A bracket or support member consisting of a channel shaped beam or the like is arranged along the rear transversely extending side of the rectangularly shaped auxiliary frame which carries the third support for the driver cab. The tiltable auxiliary frame thereby includes the engine cooler or radiator, while one of the two channel shaped members of the tiltable auxiliary frame disposed essentially parallel to the main frame longitudinal bearer members may be provided with a plate member which extends over the adjacent main frame longitudinal bearer member and constitutes a base plate for the foot pedal mechanism and the steering column.

Accordingly, it is an object of the present invention to provide a driver cab for a truck-type motor vehicle which obviates the disadvantages and shortcomings of the prior art and which makes it possible to utilize the space available within the driver cab in the best possible manner.

Still another object of the present invention is the provision of a tiltable driver cab and an arrangement of the drive unit or aggregate in relation thereto in such a manner that a seating arrangement extending transversely of the vehicle within the driver cab in an uninterrupted manner is possible so as to seat the largest possible number of persons within the driver cab while at the same time minimizing the transmission of undesirable noises and radiation of heat from the engine into the driver cab.

Still another object of the present invention resides in the provision of a driver cab adapted to be pivoted so as to be tiltable forwardly to thereby expose the drive unit or aggregate.

Another object of the present invention is the provision of a support for the driver cab of a truck-type vehicle which utilizes an auxiliary frame facilitating the support of the driver cab as well as the tiltability thereof.

These and other objects, features and advantages of the present invention will become more obvious from the following description when taken in connection with the accompanying drawing which shows, for purposes of illustration only, several embodiments in accordance with the present invention, and wherein FIGURE 1 is a partial schematic side view of the front part of a truck-type motor vehicle in accordance with the present invention with the driver cab in the normal position thereof, FIGURE 2 is a schematic side view of the front part of a truck-type motor vehicle according to FIGURE 1 with the driver cab thereof tilted forwardly, FIGURE 3 is a cross sectional view through a slightly modified embodiment of a truck-type motor vehicle construction according to the present invention and taken along a line through the rear end of the cab and looking in a forward direction, and FIGURE 4 is a top plan view showing some of the details of the embodiment of FIGURE 3 of the front part of a truck-type motor vehicle in accordance with the present invention therein omitting the driver cab and driver seat for purposes of clarity.

Referring now to the drawing wherein like reference numerals are used throughout the various views to designate corresponding parts, and more particularly to FIGURES 1 and 2 thereof, reference numeral 1 designates the driver cab which is elastically supported with respect to the sub-frame of the motor vehicle by means of five rubber bearings 2, 3, 4, 5, and 6, and more particularly by meaans of rubber bearings 2, 3, and 4 with respect to the tiltable auxiliary frame 7 and by means of rubber bearing 5 and 6 directly with respect to the vehicle main frame or superstructure 8 or any analogous vehicle part. The rubber bearings 2 and 3 of the rubber bearings 5 and 6 are disposed behind each other as seen in FIGURES 1 and 2 so that only one bearing thereof, namely the left bearing thereof is visible in these two views. The rubber bearings 2, 3, and 4 are rigidly connected with the floor 9 of the driver cab 1 and with the tiltable auxiliary frame 7 in such a manner as to be detachable therefrom only with difficulty whereas the bearings 5 and 6 are connected with the floor 9 of the driver cab 1 and with the main vehicle frame 8 so a sto be readily detachable.

The tiltable auxiliary frame 7 is rigidly connected with the vehicle frame or superstructure 8 by means of two joints 9' disposed alongside each other and constituting pivotal bearings or rotatable supports, and of which only one is visible in FIGURES 1 and 2 and by means of the angle iron 10 which is detachably connected with the vehicle frame or superstructure 8.

If the detachable connection 10 is loosened and if the pivotal bearings or rotatable supports 9' which are adapted to be tightened in any suitable manner so as to become non-rotatable are released then the entire driver cab 1 may be tiltable forwardly about the common axis of joints 9' which may be constructed, for example as hinge-like joints.

The tiltable auxiliary frame 7 serves as support for the cooler or radiator 11, the foot pedal mechanism 12 consisting of clutch, brake and gas pedals, the shifting lever 13 and the steering column 14 and carries at the forward end thereof the cross bearer member 15 serving simultaneously as a bumper or bumper rail. The engine 16 together with the change speed transmission is disposed between the two rear rubber bearings 5 and 6. The engine 16 is represented schematically in FIGURES 1 and 2 as a rectangle. As may be readily seen in these two figures, the drive aggregate extends below the seat bench 17 between the two longitudinal bearer members of the main frame 8. The engine 16 may drive a shafting at its forward end in the manner illustrated in FIGURE 4, such shafting being utilizable for any purpose desired, for example, for driving a device affected by the pivotal movement of the frame 7. As shown in FIGURE 4, the shafting comprises slidably connected members such as the member 37, and these are provided at their ends with universal joints.

The foot pedal mechanism 12, the shafting lever 13 and the sliding mechanism comprising the steering column 14 may be coupled with their respective co-acting mechanisms, for example, by means of articulated linkages, which may be designed in such a manner as to compensate for the tiltable movement of the frame 7. Since such co-acting mechanisms and articulated linkages form per se no part of the present invention, further description thereof is deemed unnecessary herein. The radiator may be connected with the engine in any suitable manner providing for the tilting movement of the frame 7, for example, by flexible conduit means. Such a means is shown in the patent to Molly, No. 2,382,437, wherein a pivotally movable member 12 of a hydraulic unit is connected by flexible conduit member 20 to a relatively stationary member of the unit. Since the connecting means between applicant's radiator and engine forms no part of the present invention, it is deemed unnecesary to furnish a more explicit disclosure thereof.

FIGURE 3 represents the forward part of a modified truck-type motor vehicle taken along a line through the rear end of the cab and looking in a forward direction. The engine is thereby represented in the inclined position thereof inclined by approximately 60° with respect to the vertical. Furthermore, the longitudinal frame bearer members 18 and 19 which are used in this modified embodiment may be readily seen in this view to which are secured the brackets 20 and 21. The rear rubber bearings 23 and 24 are disposed between brackets 20 and 21 and the driver cab 1.

FIGURE 4 illustrates an embodiment of the tiltable auxiliary frame 7 which has been illustrated only schematically in FIGURES 1 and 2, and shows some of the details thereof. The tiltable auxiliary frame 7 consists in FIGURE 4 of four channel-shaped profile members 25, 26, 27, and 28. The forward cross bearer member 25 which supports thereon the driver cab 1 is shown of stronger, heavier construction as compared to the other profile members 26, 27, and 28 of the tiltable auxiliary frame 7 which are arranged in a U-shaped manner, and extends beyond the two main frame longitudinal bearer members 18 and 19 of the vehicle main frame or superstructure toward the sides by a considerable amount. The cross bearer member 25 is angularly bent rearwardly at both ends 29 and 30 thereof. These two ends 29 and 30 support thereon the two rubber bearings 2 and 3 already mentioned in connection with the embodiment of FIGURES 1 and 2. The entire tiltable auxiliary frame 7 is pivotally connected at the longitudinal main frame bearer members 18 and 19 by means of tiltable supports or joints 31 and 32 which are adapted to be tightened so as to become nontiltable. The auxiliary tiltable frame 7 includes within the rectangle formed thereby the radiator 33 of the engine. The profile member 28 is provided with a plate member 28' which is so constructed and arranged that it extends beyond the longitudinal bearer member 19 and serves as supporting plate 28' for the foot pedal mechanism 12 and steering column 14. The supporting plate member 28' may also be constructed as a part, for example, as an enlarged leg portion of the channel-shaped profile member 28.

Threaded connections for example, constituted by means of bolts 34 or the like are indicated in FIGURE 4 of the drawing at the rear end of the rectangular tiltable auxiliary frame 7 which connect the auxiliary tiltable frame 7, under normal operating conditions, rigidly with the vehicle main frame or superstructure. A further bracket-like channel-shaped profile member 35 is connected with or secured to the profile member 27 in any suitable manner, for example, by welding, bolting or the like and supports thereon the rubber bearing 4. Furthermore, the shifting lever 36 is arranged on the profile member 27. Lateral brackets 20 and 21 adapted to receive or accommodate the rubber bearings 22 and 24 are visible in FIGURE 4 which are arranged on or secured to the longitudinal bearer members 18 and 19 and which are disposed approximately within the region of the center of the aggregate formed by the engine and transmission unit. This drive aggregate or unit is disposed, according to FIGURE 4, between the two longitudinal bearer members 18 and 19.

While I have shown and described several embodiments in accordance with the present invention, it is understood that the same is not limited thereto but is susceptible of many changes and modifications within the spirit and scope of the present invention.

The construction of the tiltable driver cab according to the present invention, especially the construction of the tiltable auxiliary frame and the number and the arrangement of the elastic and rigid supports thereof are not limited to the embodiments illustrated herein. With other types and sizes of vehicles as well as with other requirements, different constructions are possible within the spirit and scope of the main inventive concept of the present application.

Thus, it is quite clear that the present invention is not limited to the specific details described herein but may find useful application in other types of vehicles and may be modified to conform to the particular requirements and needs thereof. Consequently, I do not wish to be limited to the particular details described herein but intend to cover all such changes and modifications as are encompassed by the scope of the claims appended hereto.

I claim:

1. A truck type motor vehicle comprising a main vehicle frame having longitudinally extending bearer members, a drive unit with the longitudinal axis thereof disposed essentially in the driving direction of the vehicle and inclined about the crank shaft thereof with respect to the vertical, a driver cab having a level floor section and seat means, said drive unit being disposed below said seat means, and means for tiltably supporting said driver cab on said main vehicle frame so as to be tiltable forwardly and thereby expose said drive unit comprising an auxiliary frame means disposed below said floor section forwardly of said drive unit, said frame means including members forming an essentially rectangular frame, said last-named members including forwardly extending side members, coaxial tiltable joints interconnecting the forward ends of said side members and the forward ends of said bearer members, said members forming an essentially rectangular frame further comprising a cross bearer member connecting and disposed forwardly of said side members, first resilient bearing units for supporting said floor section on said cross bearer member, means including a second resilient bearing unit spaced rearwardly of said cross bearer member on said rectangular frame and resiliently connecting said cab to a rear part of said rectangular frame, and third resilient units separably supporting the rear end of said cab on said vehicle frame.

2. A truck-type motor vehicle according to claim 1, wherein said first, second and third resilient bearing units include five elastic bearing members, of which three elastic bearing members connect said driver cab with said rectangular frame.

3. A truck-type motor vehicle according to claim 2, wherein two of said three elastic bearer members are arranged on said cross bearer member and wherein the third one of said three elastic bearing members is arranged essentially in the longitudinal vertical vehicle plane.

4. A truck-type motor vehicle according to claim 1, wherein said cross bearer member extends essentially transversely to the vehicle driving direction beyond said main vehicle frame on both sides thereof, and wherein a resilient bearing member forming one of said first resilient bearing units is arranged on each end of said cross bearer member.

5. A truck-type motor vehicle according to claim 4, wherein the vehicle includes bumper means, and wherein said cross bearer member effectively supports said bumper means.

6. A truck-type motor vehicle according to claim 5, wherein said transverse bearer member forms said bumper means itself.

7. A truck-type motor vehicle comprising a vehicle superstructure, a drive unit with the longitudinal axis thereof disposed essentially in the driving direction of the vehicle and inclined about the crankshaft thereof with respect to the vertical, a driver cab with a floor means and seat means, said drive unit being disposed below said seat means, and means including auxiliary frame means pivotally connected with said superstructure for tiltably supporting said driver cab on said superstructure so as to be tiltable forwardly and thereby expose said drive unit, first elastic means for supporting the forward end of said floor means on said auxiliary frame means, second elastic means for detachably supporting the rear end of said driver cab on said vehicle superstructure, and third means pivotally securing the forward end of said auxiliary frame means on said vehicle superstructure, said vehicle further including steering means, foot pedal means, radiator means and shifting means for changing the vehicle speed, said auxiliary frame means serving as direct support member for said steering means, said foot pedal means, said radiator and said shifting lever means to thereby eliminate the effects of the elastic support of said driver cab caused by said first and second elastic means.

8. A truck-type motor vehicle according to claim 7, wherein said auxiliary frame means comprises a transverse bearer member and wherein said radiator means is arranged directly behind said transverse bearer member, said foot pedal means, said shifting lever means and said steering means being arranged behind said radiator means as seen in the driving direction of the vehicle.

9. A truck-type motor vehicle comprising a vehicle superstructure, a drive unit with the longitudinal axis thereof disposed essentially in the driving direction of the vehicle and inclined about the crankshaft thereof with respect to the vertical, a driver cab with a floor means and seat means, said drive unit being disposed below said seat means, and means including auxiliary frame means pivotally connected with said superstructure for tiltably supporting said driver cab on said superstructure so as to be tiltable forwardly and thereby expose said drive unit, first elastic means for supporting the forward end of said floor means on said auxiliary frame means, second elastic means for detachably supporting the rear end of said driver cab on said vehicle superstructure, and third means pivotally securing the forward end of said auxiliary frame means on said vehicle superstructure, said vehicle superstructure including two longitudinal frame bearer members, said auxiliary frame means being constructed as an essentially rectangular frame, said frame means comprising two transverse frame members disposed between said two longitudinal frame bearer members, said frame means further comprising longitudinally extending side frame members, means pivotally supporting the forward ends of said longitudinally extending side frame members on said longitudinal frame bearer members to thereby enable pivotal movement of said auxiliary frame means and of said driver cab with respect to said longitudinal frame bearer members, the front transverse frame member of said auxiliary frame means being of relatively heavier construction than the other frame members thereof and extending on both sides thereof beyond said longitudinal frame bearer members and being provided on each end with an angularly bent end portion bent slightly in the backward direction, one elastic bearing support being arranged on each of said end portions of said transverse frame member to support thereon said driver cab, and bracket means secured to the rear transverse frame member of said auxiliary frame means extending essentially perpendicularly with respect thereto and supporting thereon a third elastic bearing member for supporting thereon said driver cab.

10. A truck-type motor vehicle comprising a vehicle superstructure, a drive unit with the longitudinal axis thereof disposed essentially in the driving direction of the vehicle and inclined about the crankshaft thereof with respect to the vertical, a driver cab with a floor means and seat means, said drive unit being disposed below said seat means, and means including auxiliary frame means pivotally connected with said superstructure for tiltably supporting said driver cab on said superstructure so as to be tiltable forwardly and thereby expose said drive unit, first elastic means for supporting the forward end of said floor means on said auxiliary frame means, second elastic means for detachably supporting the rear end of said driver cab on said vehicle superstructure, and third means pivotally securing the forward end of said auxiliary frame means on said vehicle superstructure, said vehicle further comprising radiator means, foot pedal means and steering means, said vehicle superstructure including two longitudinal frame bearer members, said auxiliary frame means being of essentially rectangular shape and comprising two side frame members extending essentially parallel to said longitudinal frame bearer members, and plate means secured to one of said side frame members of said auxiliary frame means and extending above the adjacent longitudinal frame bearer member for supporting thereon directly said foot pedal means and said steering means, said radiator means being arranged within the contours of said rectangular auxiliary frame means.

References Cited in the file of this patent

UNITED STATES PATENTS

| | | |
|---|---|---|
| 1,648,804 | Griese | Nov. 8, 1927 |
| 2,210,519 | Wollensak | Aug. 6, 1940 |
| 2,376,491 | Kinney | May 22, 1945 |
| 2,502,622 | Harris | Apr. 4, 1950 |
| 2,536,560 | Limon | Jan. 2, 1951 |
| 2,845,133 | Norrie et al. | July 29, 1958 |
| 2,864,121 | Imber et al. | Dec. 16, 1958 |

FOREIGN PATENTS

| | | |
|---|---|---|
| 346,464 | Great Britain | Apr. 16, 1931 |